(12) United States Patent
Liu et al.

(10) Patent No.: US 9,164,280 B1
(45) Date of Patent: Oct. 20, 2015

(54) DUST-PROOF ASSEMBLY FOR LENS DRIVING DEVICE

(71) Applicant: TOPRAY MEMS INC., Hsinchu (TW)

(72) Inventors: Chin-Sung Liu, Hsinchu (TW); Yi-Jung Chen, Hsinchu (TW); Yueh-Lin Hsieh, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days.

(21) Appl. No.: 14/314,653

(22) Filed: Jun. 25, 2014

(51) Int. Cl.
*G06K 7/10* (2006.01)
*G02B 27/00* (2006.01)

(52) U.S. Cl.
CPC .................................. *G02B 27/0006* (2013.01)

(58) Field of Classification Search
CPC . H04N 5/2257; H04N 5/2254; H04N 5/2253; H04N 5/23212; H04N 5/23283; H04N 5/23287; G02B 27/0006; G02B 27/646; G02B 5/06; G02B 7/021; G02B 7/025; G02B 7/08; G02B 7/102; G03B 2205/0023

USPC ................ 235/385, 454, 455, 462.01–462.45
See application file for complete search history.

(56) References Cited

U.S. PATENT DOCUMENTS

| | | | |
|---|---|---|---|
| 2006/0268430 A1* | 11/2006 | Sasaki ........................... | 359/699 |
| 2006/0268436 A1* | 11/2006 | Sasaki ........................... | 359/822 |
| 2012/0133825 A1* | 5/2012 | Nakajima et al. ............. | 348/374 |
| 2013/0027351 A1* | 1/2013 | Los ................................ | 345/175 |
| 2014/0147479 A1* | 5/2014 | Agerup ......................... | 424/401 |
| 2014/0198385 A1* | 7/2014 | Chou ............................. | 359/507 |
| 2014/0340537 A1* | 11/2014 | Eromaki ................... | 348/208.8 |
| 2015/0070765 A1* | 3/2015 | Lam .............................. | 359/508 |

* cited by examiner

*Primary Examiner* — Thien M Le
(74) *Attorney, Agent, or Firm* — Rabin & Berdo, P.C.

(57) ABSTRACT

A dust-proof assembly for the lens driving device is disclosed, including at least a ring-shaped element and at least a flexible element. The at least a ring-shaped element is disposed with a tiny gap surrounding a lens assembly. The at least a flexible element fixes the at least a ring-shaped element to a bottom. The dust-proof assembly is able to prevent external foreign objects, such as particles or dusts, from falling onto a sensor element.

9 Claims, 5 Drawing Sheets

US 9,164,280 B1

DUST-PROOF ASSEMBLY FOR LENS DRIVING DEVICE

TECHNICAL FIELD

The technical field generally relates to a lens driving device, and more particularly to a dust-proof assembly for lens driving device.

BACKGROUND

As the technology progresses, the smart phone become ubiquitous and the number of pixels of the camera in the smart phone greatly increases. Because the camera of the smart phone features a digital sensor to form imaging, the sensor quality is greatly related to the photo quality. If dust or any foreign objects falls on the sensor, the dust or the foreign objects will also appear in the photo. In addition, the demands on the cleanliness of the key parts of the camera module upgrade become higher as the number of pixels of the camera increases. In particular, special concerns are emphasized over the dust and external pollutions caused by the mechanical motion of the voice coil motor or during manufacturing.

FIG. 1A shows a cross-sectional view of a known lens driving device, and FIG. 1B shows a schematic view of detailed structure and motion of FIG. 1A. As shown in FIG. 1A, a lens driving device 10 includes a lens assembly 11, a lens carrier base 12, an upper cover 13, a bottom 14, and a sensor element 15. The lens carrier base 12 is for housing the lens assembly 11, which is loaded into the lens carrier base 12 through screw threads. The lens carrier base 12 is connected to the bottom 14 through a plurality of resilient elements (not shown). The upper cover 13 is disposed outside of the lens carrier base 12 and is fixed to the bottom 14. The sensor element 15 is disposed underneath the lens assembly 11. The lens carrier base 12 is able to move back and forth along the Z direction for the focusing of the lens assembly 11.

As shown in FIG. 1B, when the lens carrier base 12 moves the lens assembly 11 towards Z direction for focusing, a gap 16 is formed between the lens carrier base 12 and bottom 14, and foreign objects 17 may fall on the sensor element 15 through the gap 16, which results in dots or other shadows on the photo taken by the sensor element 15.

SUMMARY

An exemplary embodiment describes a dust-proof assembly for lens driving device.

A dust-proof assembly for the lens driving device of the present invention includes at least a ring-shaped element and at least a flexible element. The at least a ring-shaped element is disposed with a tiny gap surrounding a lens assembly. The at least a flexible element fixes the at least a ring-shaped element to a bottom. The dust-proof assembly is able to prevent external foreign objects, such as particles or dusts, from falling onto a sensor element.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1A:
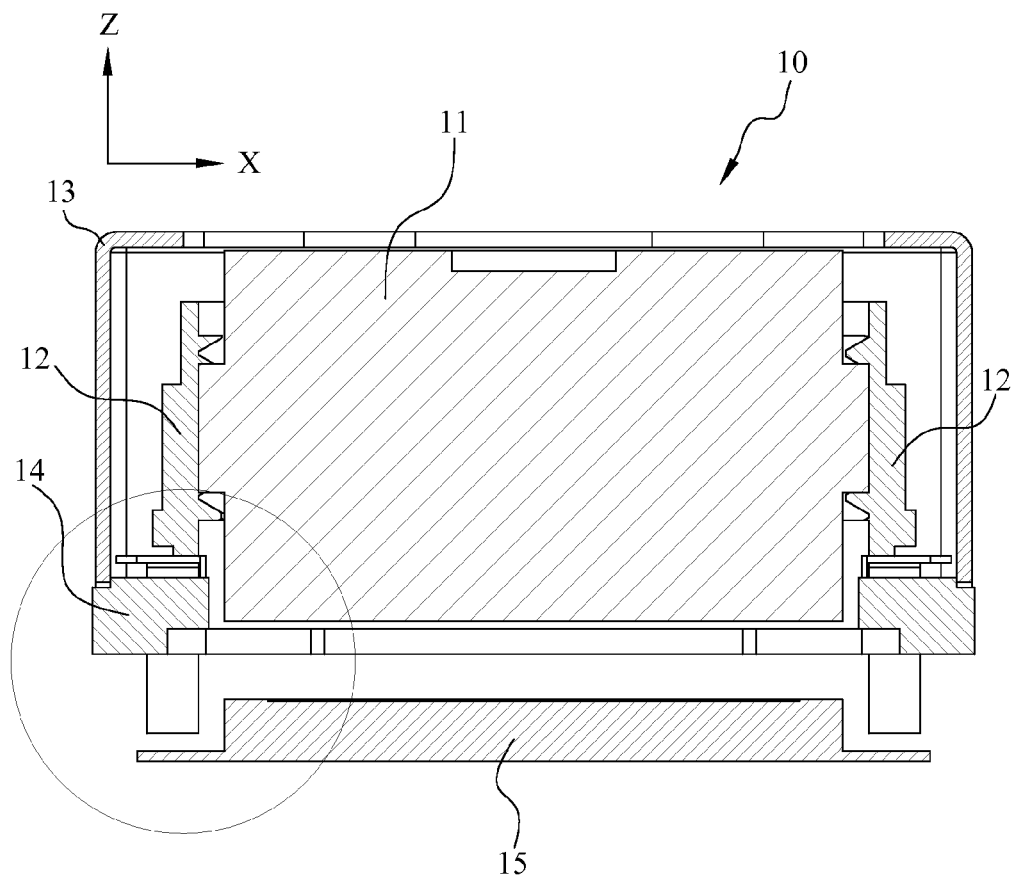
FIG. 1A shows a cross-sectional view of a known lens driving device.
Figure 1B:
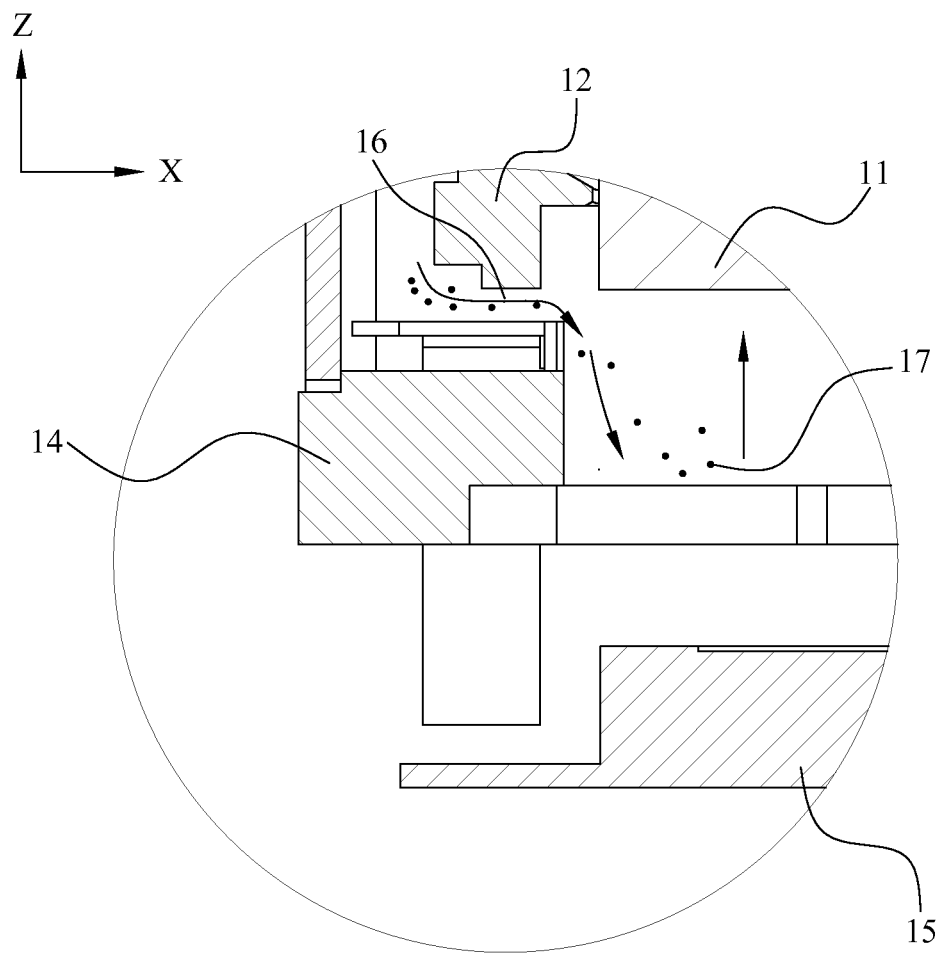
FIG. 1B shows a schematic view of detailed structure and motion of FIG. 1A.
Figure 2:
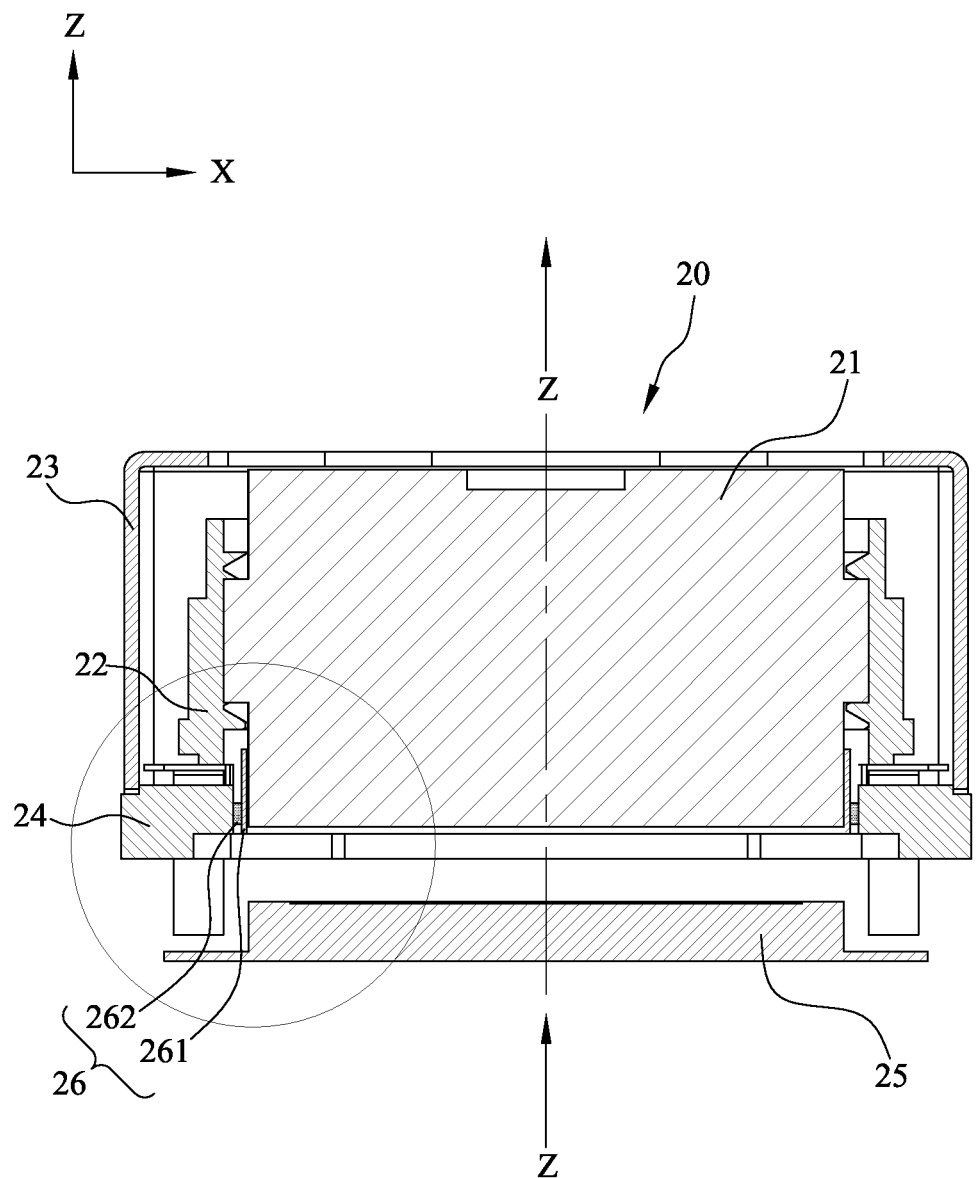
FIG. 2 shows a schematic view of an exemplar indicating the disposition location of the dust-proof assembly in accordance with an embodiment.

FIG. 2 shows a schematic view of an exemplar indicating the disposition location of the dust-proof assembly in accordance with an embodiment. As shown in FIG. 2, a dust-proof assembly 26 includes at least a ring-shaped element 261 and at least a flexible element 262. A lens driving device 20 includes a lens assembly 21, a lens carrier base 22, an upper cover 23, a bottom 24, and a sensor element 25. The lens carrier base 22 is for housing the lens assembly 21. The lens carrier base 22 is connected to the bottom 24 through a plurality of resilient elements (not shown). The upper cover 23 is disposed outside of the lens carrier base 22 and is fixed to the bottom 24. The at least a ring-shaped element 261 is disposed with a tiny gap (about 0.1 mm) surrounding the lens assembly 21. The at least a flexible element 262 fixes the at least a ring-shaped element 261 to the bottom 24. The sensor element 25 is disposed underneath the lens assembly 21. The lens carrier base 22 is able to move back and forth along the Z direction for the focusing of the lens assembly 11. Because the at least a ring-shaped element 261 is disposed with a tiny gap surrounding the lens assembly 21, the dust-proof assembly 26 will not affect the motion of the lens assembly 21.

The at least a ring-shaped element is of a single-ring structure, a pair of half-circle structure, or a plurality of arc structures, and is made of plastic, metal, or a composite material. The at least a flexible element is a glue or an elastic material.

Figure 3:
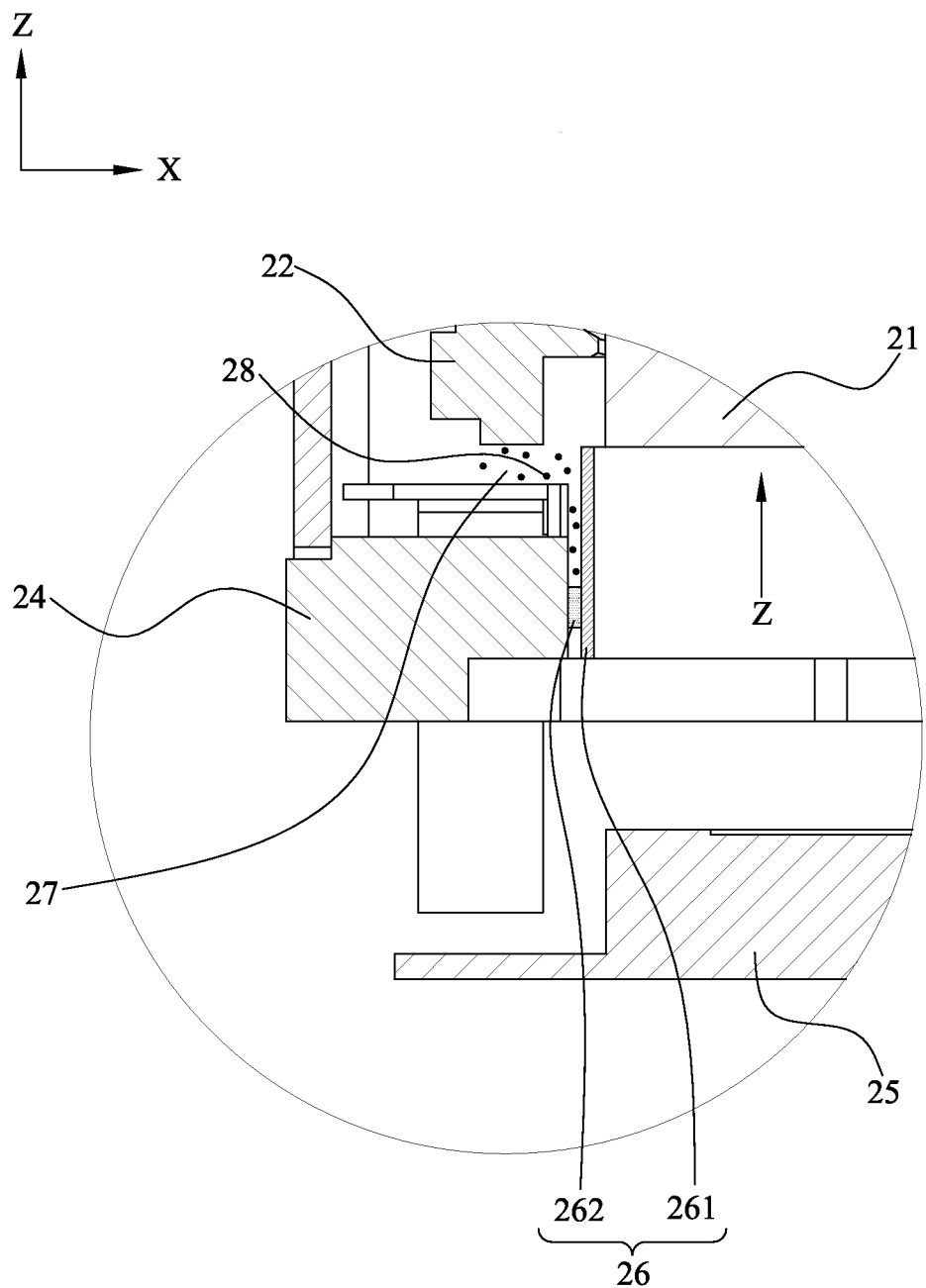
FIG. 3 shows a schematic view of how the dust-proof assembly achieving in preventing dusts in accordance with an embodiment.

FIG. 3 shows a schematic view of how the dust-proof assembly achieving in preventing dusts in accordance with an embodiment. As shown in FIG. 3, when the lens carrier base 22 moves the lens assembly 21 towards Z direction for focusing, a gap 27 is formed between the lens carrier base 22 and the bottom 24, and foreign objects 27 may fall on the dust-proof assembly 26 formed by at least a ring-shaped element 261 and at least a flexible element 262. Therefore, the at least a ring-shaped element 261 and at least a flexible element 262 can effectively prevent the foreign objects 28 from falling onto the sensor element 25 to achieve dust-proof.

The at least a ring-shaped element has a height taller than or equal to the maximum distance along the Z direction that the lens assembly moves, wherein Z direction is the focusing direction of the lens assembly.

Figure 4:
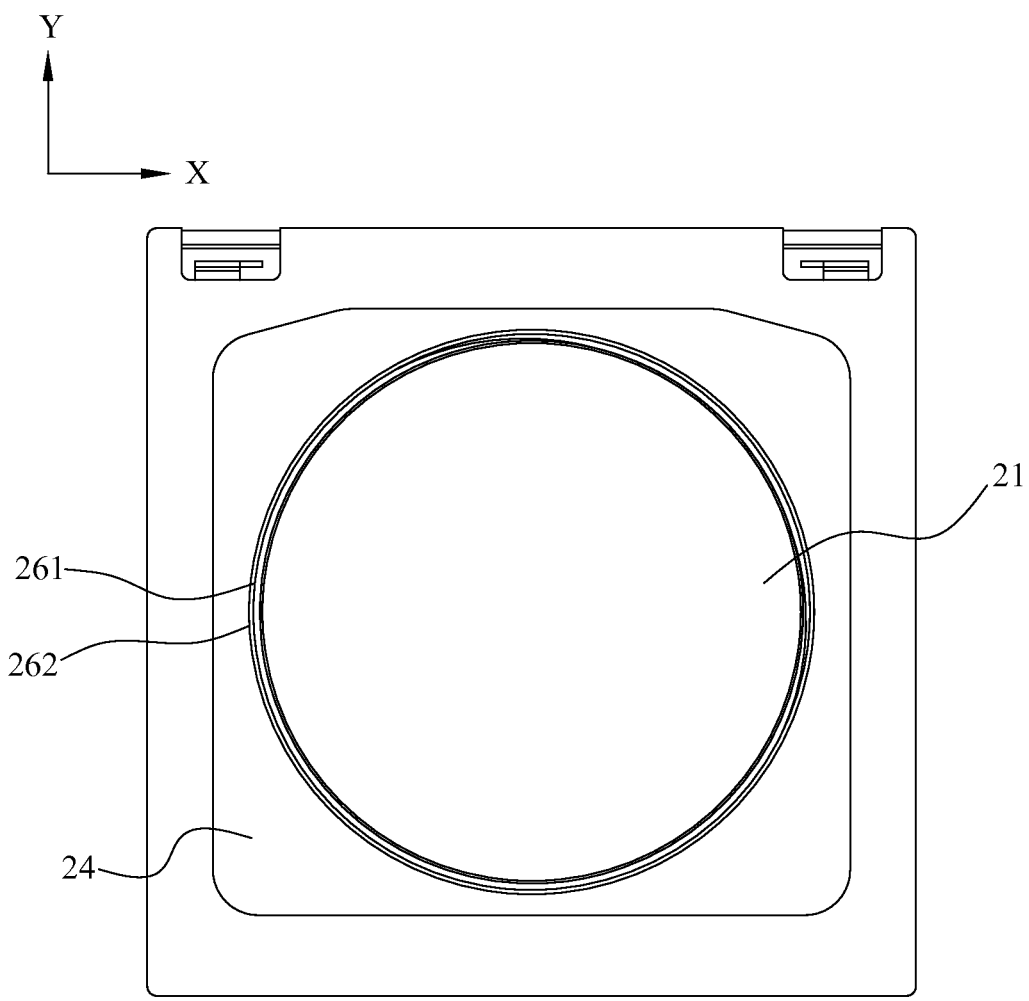
FIG. 4 shows a top view of the lens driving device and the dust-proof assembly in accordance with an embodiment.

FIG. 4 shows a top view of the lens driving device and the dust-proof assembly in accordance with an embodiment. As shown in FIG. 4, the at least a ring-shaped element 261 is disposed to surround the lens assembly 21 with a tiny gap between the at least a ring-shaped element and the lens assembly 21. The outside of the at least a ring-shaped element 261 is fixed to the bottom 24 by the at least a flexible element 262. The at least a ring-shaped element 261 can be embodied as of a single-ring structure, a pair of half-circle structure, or a plurality of arc structures. In the present embodiment, a single ring is shown. As the single ring structure is monolithically manufactured, braking off or poor assembly caused the complication of structure is avoided.

In summary, the dust-proof assembly for lens driving device of the present invention can effectively prevent dust or other foreign objects from falling onto sensor element to achieve dust prevention and avoid shadows formed on the sensor element. In addition, the dust-proof assembly is made of resilient material and disposed surrounding the lens assembly, which also provides additional protection to the lens assembly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dust-proof assembly for lens driving device, applicable to a lens driving device having
   a lens assembly,
   a lens carrier base,
   an upper cover,
   a bottom,
   a plurality of resilient elements and
   at least a sensor element,
   the dust-proof assembly comprising:
   at least a ring-shaped element and
   at least a flexible element; wherein
   the lens carrier base being for housing the lens assembly;
   the lens carrier base being connected to the bottom through the plurality of resilient elements;
   the upper cover being disposed outside of the lens carrier base and fixed to the bottom;
   the at least a ring-shaped element being disposed with a tiny gap surrounding the lens assembly;
   the at least a flexible element fixing the at least a ring-shaped element to the bottom; and
   the sensor element being disposed underneath the lens assembly.

2. The dust-proof assembly as claimed in claim 1, wherein the at least a ring-shaped element is of a single ring structure.

3. The dust-proof assembly as claimed in claim 2, wherein the single ring structure is monolithically manufactured.

4. The dust-proof assembly as claimed in claim 1, wherein the at least a ring-shaped element is of a pair of half-circle structure.

5. The dust-proof assembly as claimed in claim 1, wherein the at least a ring-shaped element is of a plurality of arc structure.

6. The dust-proof assembly as claimed in claim 1, wherein the at least a ring-shaped element is made of plastic, metal, or a composite material.

7. The dust-proof assembly as claimed in claim 1, wherein the at least a flexible element is made of a glue.

8. The dust-proof assembly as claimed in claim 1, wherein the at least a flexible element is made of an elastic material.

9. The dust-proof assembly as claimed in claim 1, wherein the at least a ring-shaped element has a height taller than or equal to the maximum distance along a Z direction that the lens assembly moves, and
   Z direction is the focusing direction of the lens assembly.

* * * * *